United States Patent [19]

Orikasa et al.

[11] Patent Number: 4,926,276
[45] Date of Patent: May 15, 1990

[54] MAGNETIC HEAD HAVING REINFORCING BLOCK

[75] Inventors: Tsuyoshi Orikasa, Kasukabe; Fujihiro Ito, Tsurugashima; Hiroyuki Suzuki, Yokohama; Makoto Kameyama, Urayasu; Kiyozumi Niizuma, Ohmiya; Kazuyo Yoshida; Toshio Yamanaka, both of Kawasaki, all of Japan

[73] Assignee: Canon Kabushiki Kaisha, Tokyo, Japan

[21] Appl. No.: 155,084

[22] Filed: Feb. 11, 1988

[30] Foreign Application Priority Data

Feb. 20, 1987 [JP] Japan .................................. 62-37203

[51] Int. Cl.$^5$ ........................... G11B 5/16; G11B 5/22
[52] U.S. Cl. ................................... 360/126; 360/122; 360/125
[58] Field of Search .................. 360/126, 119–120, 360/122, 125

[56] References Cited

U.S. PATENT DOCUMENTS

| | | | |
|---|---|---|---|
| 4,291,354 | 9/1981 | Chase | 360/122 X |
| 4,638,391 | 1/1987 | Hatanai et al. | 360/125 |
| 4,667,260 | 5/1987 | Perlov et al. | 360/122 |
| 4,787,004 | 11/1988 | Akiho et al. | 360/122 X |
| 4,809,111 | 2/1989 | Zieren | 360/125 |

FOREIGN PATENT DOCUMENTS

| | | |
|---|---|---|
| 51-140708 | 12/1976 | Japan . |
| 54-96013 | 7/1979 | Japan . |
| 60-32107 | 2/1985 | Japan . |
| 60-173714 | 9/1985 | Japan . |
| 62-47810 | 3/1987 | Japan . |

Primary Examiner—John H. Wolff
Attorney, Agent, or Firm—Fitzpatrick, Cella, Harper & Scinto

[57] ABSTRACT

A magnetic head is disclosed. The magnetic head has a block which is formed of a first magnetic material in which a groove for a winding is formed, a first magnetic film which is deposited on a surface of the block in which the groove is formed and is formed of a second magnetic material having a higher saturation magnetic flux density than that of the first magnetic material, a nonmagnetic film which is formed on the first magnetic film and serves as a magnetic gap, a second magnetic film which is deposited on the nonmagnetic film and is formed of the second magnetic material, and a reinforcing block. A portion of the reinforcing block on the side of a magnetic recording medium slide surface is formed of a nonmagnetic material, and the other portion is formed of a magnetic material. A magnetic material-side boundary portion between the nonmagnetic and magnetic materials is inclined to form an acute angle with the nonmagnetic film.

8 Claims, 7 Drawing Sheets (A)

(F)

(B)

(G)

(C)

(H)

(D)

(I)

(E)

(J)

(K)

MAGNETIC HEAD HAVING REINFORCING BLOCK

BACKGROUND OF THE INVENTION

1. Field of the Invention

The present invention relates to a magnetic head and, more particularly, to a magnetic head having a magnetic gap sandwiched between magnetic materials having a high saturation magnetic flux density and a reinforcing block.

2. Related Background Art

A so-called MIG (Metal in Gap) head is known and is commercially available as a magnetic head suitable for a high coercive force magnetic medium such as a metal coating tape or a metal deposition tape.

The MIG head has a structure such that a material having a high permeability such as ferrite is used for most of a core, and a magnetic pole distal end portion near a gap is formed of a high saturation magnetic flux density, i.e., an alloy magnetic material such as permalloy, Sendust, amorphous, or the like. Two typical MIG heads are known. In an MIG head of one type, a boundary between a metal magnetic material and ferrite on a slide surface is parallel to an operation gap (the head of this type will be referred to as a P type head hereinafter, and is disclosed in, e.g., Japanese Laid-Open Patent Gazette No. 140708/1976). In an MIG head of the other type, the boundary is not parallel to the operation gap to define an azimuth (the head of this type will be referred to as an A type head hereinafter, and is disclosed in, e.g., Japanese Laid-Open Patent Gazette Nos. 96013/1979 and 32107/1985, and the like). The A type MIG head has been put into practical use to date.

In the MIG head as described above, the operation magnetic gap is formed by a so-called butt process. A head in which the operation gap is formed by the conventional butt process often involves a variation in gap width, and as a result, large variations in the characteristics of heads is caused. In order to eliminate the variations, an MIG head in which a gap is formed without the butt process is also proposed. In a head of this type, an insulating film serving as a gap material as a magnetic gap is formed on a metal magnetic film, and a metal magnetic film is formed on the insulating film.

As MIG heads including no butt process, an A type head is disclosed in Japanese Laid-Open Patent Gazette No. 173714/1985, and a P type head is disclosed in Japanese Patent Application No. 187486/1985 filed by the present applicant.

FIGS. 1A and 1B are perspective views showing conventional MIG heads including no butt process. A block 2 is formed of a high permeability magnetic material such as ferrite. A first magnetic metal film 4 comprises a magnetic metal having a high saturation magnetic flux density such as Sendust. A nonmagnetic film 6 of a nonmagnetic material such as $SiO_2$ is deposited on the first magnetic metal film 4. A second magnetic metal film 8 is deposited on the nonmagnetic film 6. Nonmagnetic materials 10 and 14 such as glass are respectively deposited on the first and second magnetic metal films 4 and 8. A winding window 12 is formed between the nonmagnetic film 6 and the nonmagnetic material 10.

In the head of FIG. 1A, a nonmagnetic protection plate 16 serving as a reinforcing block is joined to the second magnetic metal film 8 by, e.g., glass welding. In the head of FIG. 1B, a nonmagnetic material 18 and a high permeability magnetic material 20 are joined to obtain a reinforcing block.

In the conventional magnetic head shown in FIG. 1A, a second magnetic pole is constituted by only the second magnetic metal film 8. Therefore, reluctance is high, and satisfactory electromagnetic conversion characteristics cannot be obtained.

In the magnetic head shown in FIG. 1B, it is preferable that a portion of the nonmagnetic material 18 facing the second magnetic metal film is small. However, if the portion of the nonmagnetic material becomes small in the reinforcing block, the high permeability magnetic material 18 is exposed due to chamferring of the head and wear, as shown in FIG. 1B. As a result, a dummy gap is undesirably formed between the high permeability magnetic material 20 and the second magnetic metal film 8, and a ripple is caused in frequency characteristics.

However, if the proportion of the nonmagnetic material 18 in the reinforcing block is increased, a noticeable improvement in electromagnetic conversion characteristics cannot be expected for the magnetic head shown in FIG. 1A.

SUMMARY OF THE INVENTION

The present invention has been made in consideration of the above situation and has as its object to improve electromagnetic conversion characteristics in the magnetic head described above.

It is another object of the present invention to provide a magnetic head which can minimize degradation in electromagnetic conversion characteristics caused by wear of a recording medium slide surface.

In order to achieve the above objects, according to one aspect of the present invention, there is provided a magnetic head as recited in independent claim 1.

Other objects and features of the present invention will be apparent from the following detailed description of an embodiment of the present invention taken in conjunction with the accompanying drawings.

DETAILED DESCRIPTION OF THE PREFERRED EMBODIMENTS

An embodiment of the present invention will be described hereinafter.

Figure 1A:
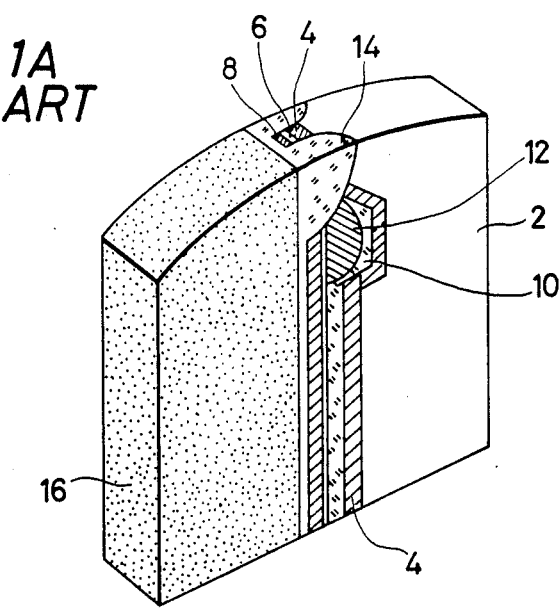
FIGS. 1A and 1B are perspective views showing outer views of conventional magnetic heads.
Figure 1B:
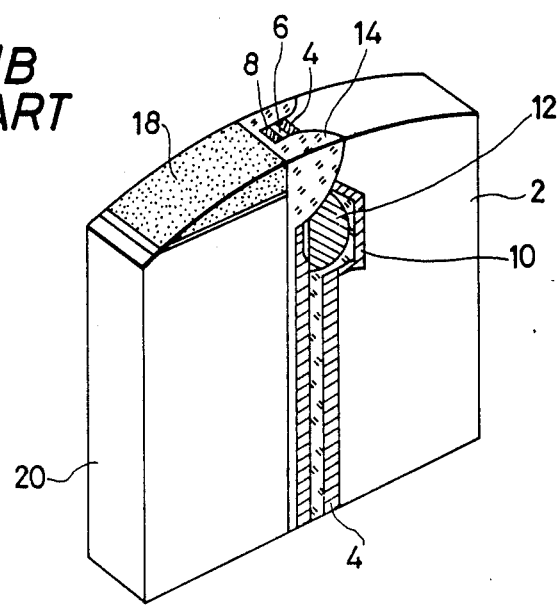
Figure 2A:
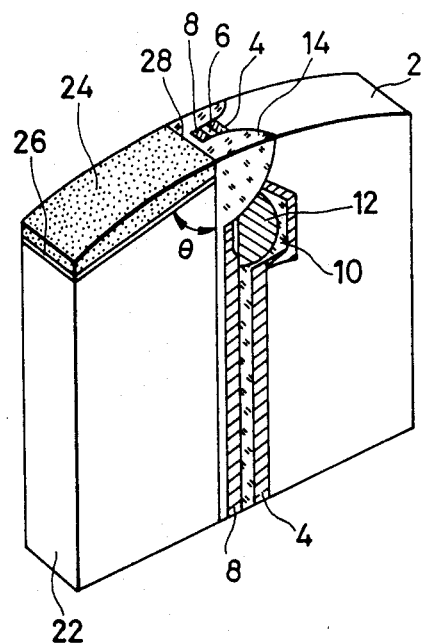
FIGS. 2A, 2B, and 2C are perspective views showing outer views of magnetic heads according to embodiments of the present invention.
Figure 2B:
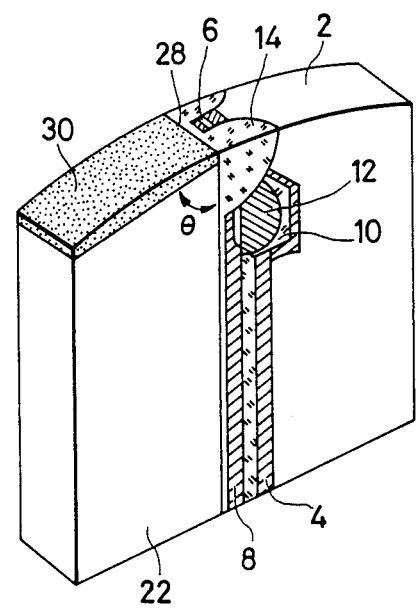
Figure 2C:
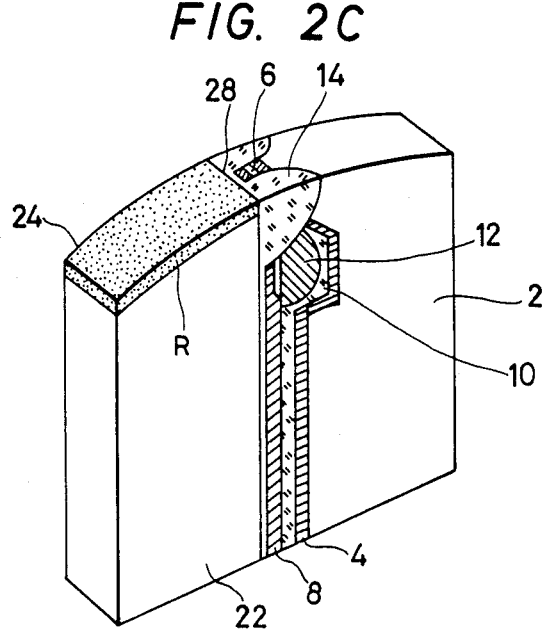

FIGS. 2A, 2B, and 2C are perspective views showing magnetic heads according to embodiments of the present invention. In each of the embodiments, a high permeability material block 2, a first magnetic metal film 4, a nonmagnetic film 6, a second magnetic metal film 8, nonmagnetic materials 10 and 14, and a winding window 12 are the same as those in the magnetic heads shown in FIGS. 1A and 1B, and a detailed description thereof will be omitted.

A magnetic head shown in FIG. 2A has a reinforcing block having a structure wherein a high permeability material block 22 is joined to a nonmagnetic material 24 by weld glass 26. The reinforcing block is joined to the second magnetic metal film by a low-melting point glass 28. A boundary surface (on the side of the high permeability material) between the high permeability material 22 and the nonmagnetic material in the reinforcing block defines an acute angle $\theta°$ with the nonmagnetic film 6 serving as the magnetic gap.

A magnetic head shown in FIG. 2B has a reinforcing block having a structure wherein a high-melting point glass 30 is joined to a high permeability material block 22. A boundary surface (on the side of the high permeability material) between the high-melting point glass 30 and the high permeability material 22 defines an acute angle $\theta°$ with the nonmagnetic film 6.

According to the magnetic heads in the above embodiments, a boundary surface between the high permeability material 22 and the nonmagnetic materials 24 and 30 forms an acute angle $\theta°$ with the magnetic gap on the side of the high permeability material. Therefore, if the medium slide surface is worn, the high permeability material is not immediately exposed from the medium slide surface. Even upon generation of wear, no ripple is generated in the frequency characteristics of the magnetic head. Nevertheless, a large contact area between the high permeability material 22 and the second magnetic metal film can be assured. Thus, very good electromagnetic conversion characteristics of the magnetic head can be obtained.

Figure 3A:
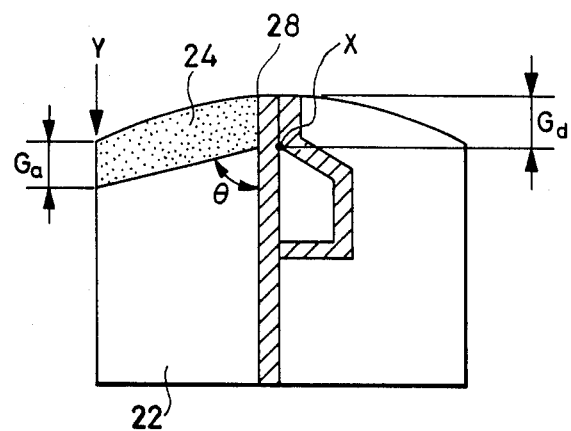
FIGS. 3A and 3B are views explaining ideal structures of the magnetic heads shown in FIGS. 2A, 2B, and 2C.
Figure 3B:
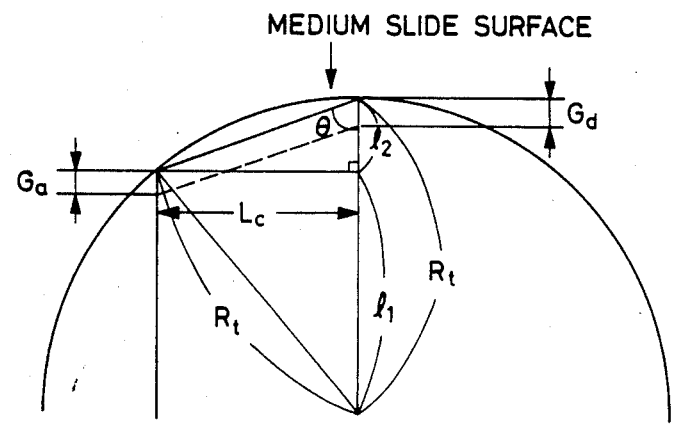

In the embodiments shown in FIGS. 2A and 2B, an ideal position of the boundary surface between the high permeability material 22 and the nonmagnetic materials 24 and 30 will be examined below. FIGS. 3A and 3B are views explaining the ideal position of the boundary surface and ideal values of $\theta$. FIG. 3A is a sectional view taken in a track width of the heads shown in FIGS. 2A and 2B.

It is preferable that the high permeability material 22 is not exposed from the medium slide surface as long as the head of this embodiment operates as a head, and that the material 22 is present as near the medium slide surface as possible within a range wherein it is not exposed from the medium slide surface even if the head is worn to a portion of a gap depth end X (shown in FIG. 3A). Therefore, the boundary surface is preferably formed from a portion near the depth end X, and the thickness of the nonmagnetic material 24 (or 30) preferably coincides with a gap depth Gd even at an end portion Y of the medium slide surface.

Assuming that the radius of curvature of the medium slide surface is given as $Rt$ and the total width of the head is given as $2Lc$, the angle $\theta$ is calculated. Although an original boundary surface is indicated by a dotted line in FIG. 3B, an angle indicated by $\theta$ need only be calculated if the vertical direction is given as a direction of the magnetic gap.

In this case, $\theta = \tan^{-1}(Lc/l_2)$, and $l_2 = Rt - l_1$, i.e., $l_2 = Rt - \sqrt{Rt^2 - Lc^2}$.

Therefore,

-continued $$\theta = \tan^{-1}\left(\frac{Lc}{Rt - \sqrt{Rt^2 - Lc^2}}\right)$$

$$= \tan^{-1}\left(\frac{Rt + \sqrt{Rt^2 + Lc^2}}{Lc}\right)$$

In the magnetic head shown in FIG. 2C, the above-mentioned boundary surface has a radius of curvature along the medium slide surface. The radius of curvature of the medium slide surface is ideally set to be smaller than that of the boundary surface by the gap depth Gd.

A method of manufacturing the magnetic head shown in FIG. 2A will be described with reference to FIGS. 4A through 4F.

Figure 4A:
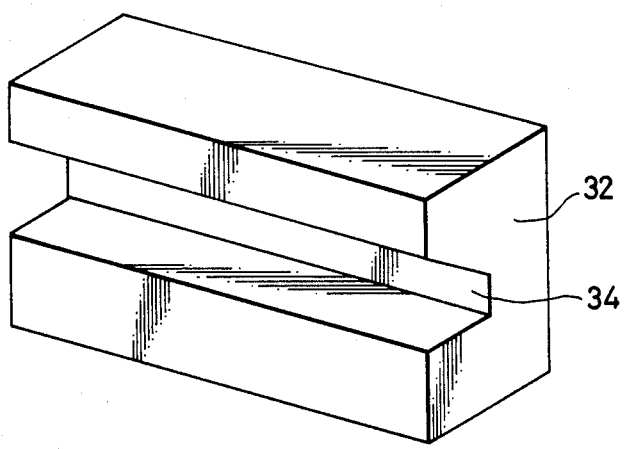
FIGS. 4A through 4F are views showing steps in the manufacture of the magnetic head shown in FIG. 2A.
Figure 4B:
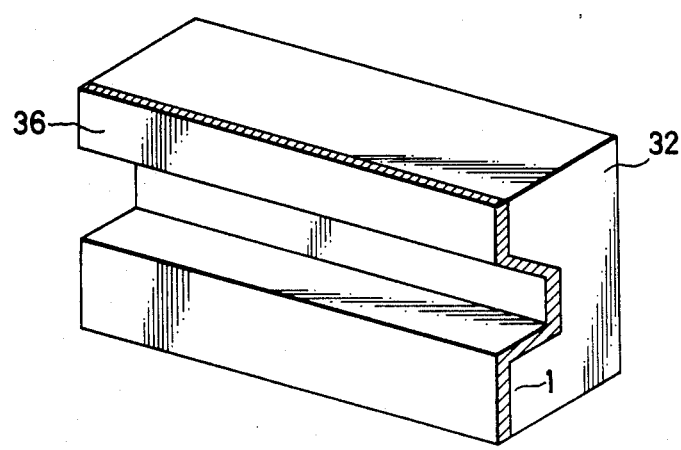
Figure 4C:
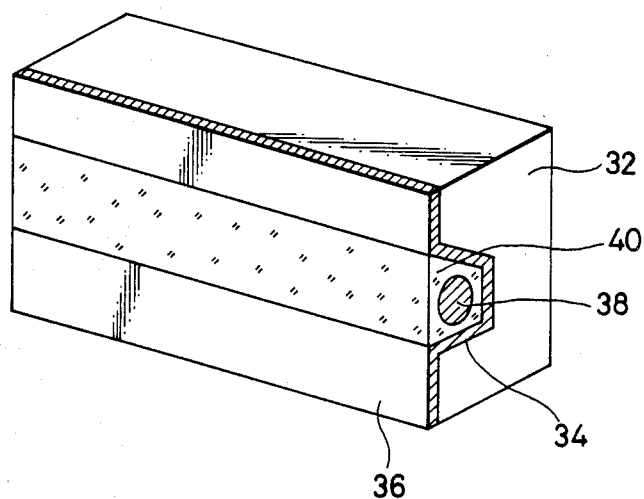
Figure 4D:
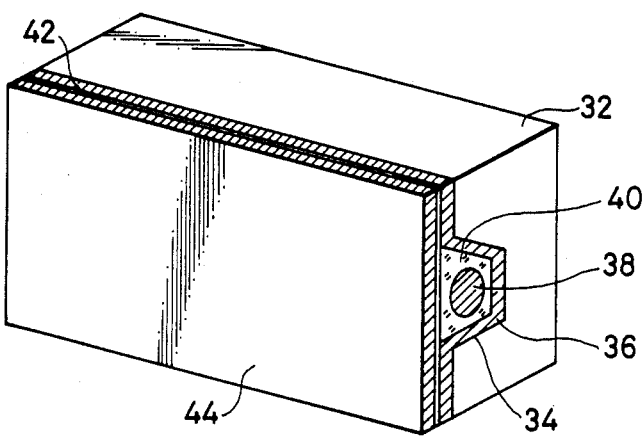
Figure 4E:
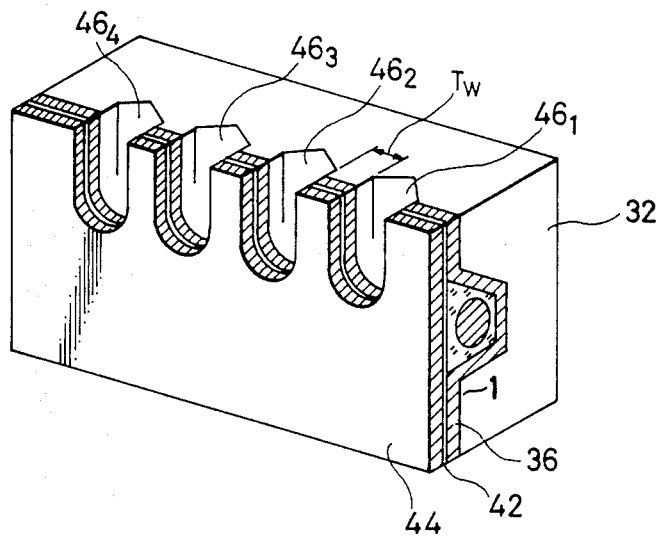

In FIG. 4A, a winding window groove 34 is formed in one surface of a ferrite single-crystal box-shaped block 32. Thereafter, a high saturation magnetic flux density material 36 is formed on the block 32 by sputtering, physical deposition, plating, CVD, or the like to have a thickness of 10 μm to 50 μm. When Sendust is employed as a high saturation magnetic flux material, generation of internal stress can be eliminated if the surface of the film 36 is parallel to or is slightly projected from the surface of the ferrite 1. After the film 36 is formed, a thin winding 38 such as aluminum, copper, nickel, zinc, iron, or the like is fitted in the groove 34, and is buried with a first low-melting point glass 40 having a melting point of 550° C. to 660° C. FIG. 4C illustrates a state wherein after the groove is buried by the first low-melting point glass 40, plane lapping is performed to form a gap surface. As shown in FIG. 4D, after the plane lapping, a gap material 42 such as $SiO_2$ is deposited on the resultant structure to have a thickness of 0.2 to 0.3 μm according to the design. Subsequently, a second metal magnetic film 44 for forming the other magnetic pole is formed on the film 42 to have a thickness of 10 to 50 μm. FIG. 4E illustrates a state wherein second grooves $46_1$ to $46_4$ are formed to regulate the track width near the gap. Two side surfaces of a track width Tw regulating portion between two adjacent grooves are substantially parallel to each other. When bonding properties of the three films 36, 42, and 44, and the ferrite 1 are not good and grooves $46_1$ to $46_4$ cannot be simultaneously formed, grooves for regulating the right side of the track and grooves for regulating the left side thereof are formed in two processes. When the groove is buried with a low-melting point glass, a thin metal film such as Cr, $CrO_3$, or the like, or a thin metal oxide film can be formed on the metal magnetic film exposed from the bottom surface of the groove in order to prevent a reaction between the metal magnetic film and the low-melting point glass.

Figure 4F:
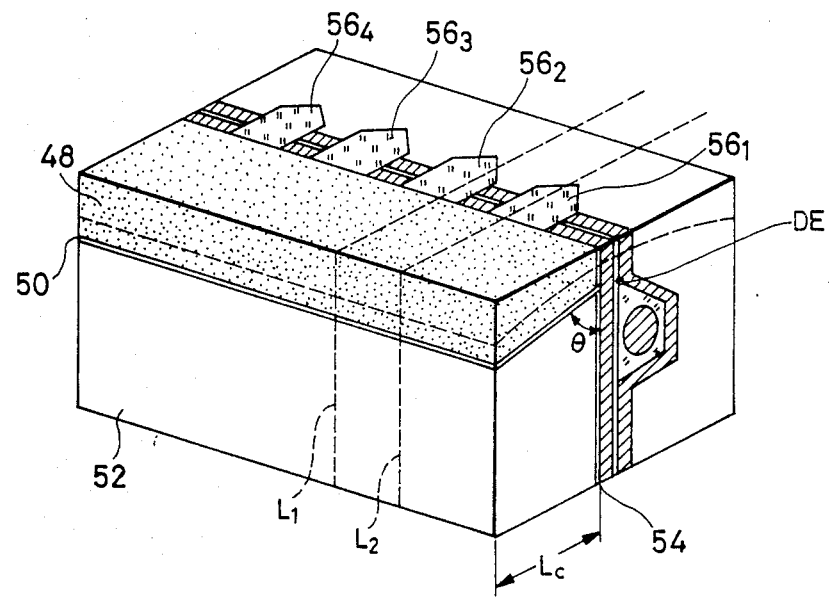

FIG. 4F illustrates a state wherein protection blocks 32, 48 and 52 prepared in advance are welded by second low-melting point glass members $56_1$ to $56_4$ having a melting point of 500° C. to 550° C. by utilizing the track width regulating grooves $46_1$ to $46_4$. In this case, these components are joined such that a position in the gap depth direction of the boundary surface between the nonmagnetic material 48 and the high permeability material 52 at which the boundary surface contacts the second magnetic metal film 44 substantially coincides with the gap depth end DE. An upper portion of the protection block on the side of the slide surface is the nonmagnetic material 48, and a lower portion thereof is the high permeability material 52 such as a ferrite single crystal. These two members are bonded by an adhesive 50 such as a third low-melting point glass having a melting point of 550° C. to 600° C. The second magnetic material may be bonded at its lower end to the high permeability material 52 and at its upper end to the nonmagnetic material 48 by a layer of adhesive 54. A chip which is cut from the core block as indicated by dotted lines $L_1$ and $L_2$ is dipped in an alkaline solution, e.g., caustic solution, or an acidic solution such as hydrochloric acid to melt and remove a metal rod 4 buried in the winding window groove, thus forming a winding window. FIG. 2A shows a schematic perspective view of a head chip after the external machining of, e.g., a slide surface.

In this embodiment, a composite block of the nonmagnetic material 24 and the high permeability material 22 is prepared by joining using the weld glass 26. In this case, if weld glass having high durability and wear resistance is used, the weld glass itself can be exposed from the medium slide surface as a nonmagnetic material without using the nonmagnetic material 21. If the weld glass is deposited after a portion of the high permeability material 22 on the side of the medium slide surface is formed to have the same shape as that of the medium slide surface of the head, a reinforcing block shown in FIG. 2C can be obtained.

Figure 5:
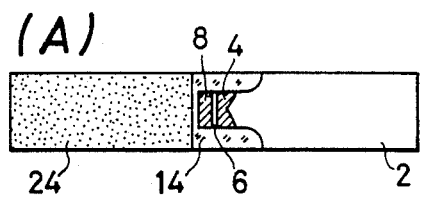
FIGS. 5(A)–(K) is a view showing various modifications of the present invention.
Figure 5:
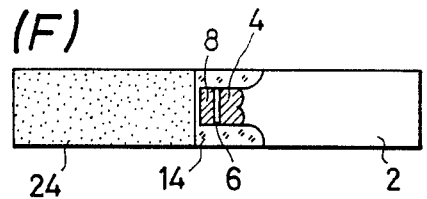
Figure 5:
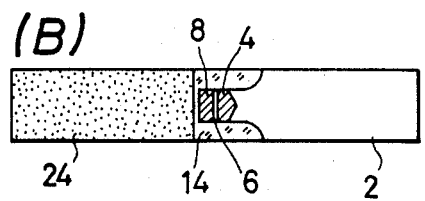
Figure 5:
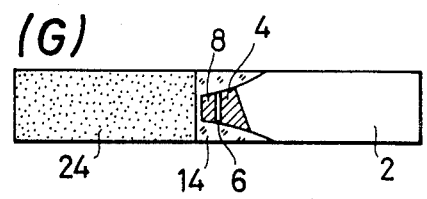
Figure 5:
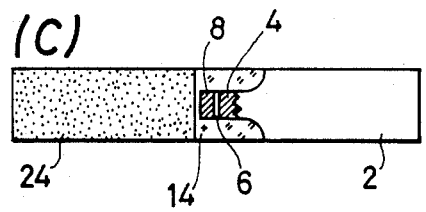
Figure 5:
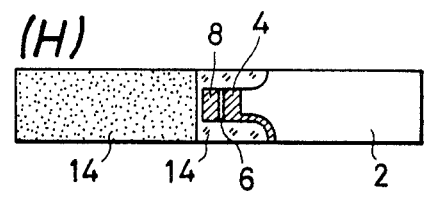
Figure 5:
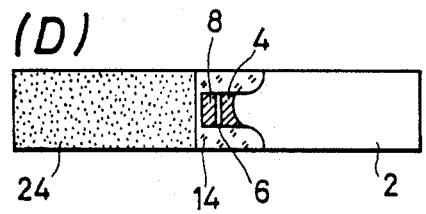
Figure 5:
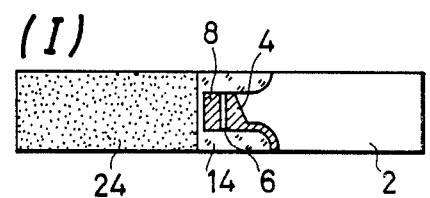
Figure 5:
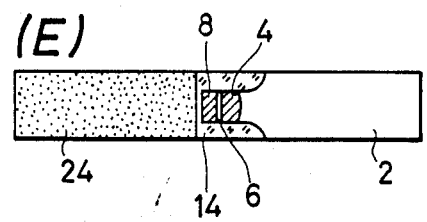
Figure 5:
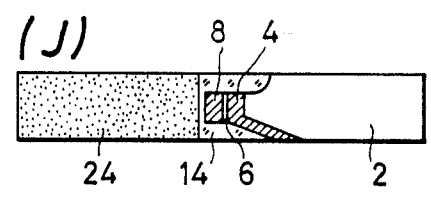
Figure 5:
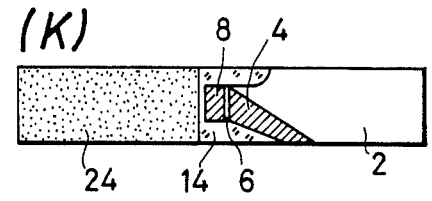

The shape of a half core body having a winding groove on the medium slide surface of the metal magnetic material 4 may be modified as shown in (A) through (K) in FIG. 5 in consideration of variations in frequency characteristics due to a dummy gap at the boundary with the high permeability material 2.

According to the present invention as described above, in a magnetic head which has a high permeability material block and in which a high saturation magnetic flux density film, a nonmagnetic film, and a high saturation magnetic flux density film are deposited on the block, a magnetic head which has a small reluctance and can maintain good electromagnetic conversion characteristics even after wear, can be obtained.

We claim:

1. A magnetic head comprising:
   (a) a block formed of a first magnetic material in which a groove for a winding is formed;
   (b) a first magnetic film deposited on a surface of said block in which said groove is formed, being formed of a second magnetic material having a higher saturation magnetic flux density than that of said first magnetic material;
   (c) a nonmagnetic film deposited on said first magnetic film serving as a magnetic gap;
   (d) a second magnetic film formed of the second magnetic material deposited on said nonmagnetic film; and
   (e) a reinforcing block contacting said second magnetic film;
   wherein a portion of said reinforcing block on a side of a magnetic recording medium slide surface is formed of a nonmagnetic material and another portion is formed of a magnetic material, and
   a magnetic material-side boundary surface between the nonmagnetic material portion and the magnetic material portion forming an acute angle with said nonmagnetic film in said reinforcing block.

2. A head according to claim 1, wherein said boundary surface is a flat surface.

3. A head according to claim 1, wherein said boundary surface is a curved surface along the magnetic recording medium slide surface.

4. A head according to claim 1, wherein an adhesive is arranged on said boundary surface.

5. A head according to claim 1, wherein the magnetic material portion of said reinforcing block is formed of said first magnetic material.

6. A head according to claim 5, wherein said first magnetic material has a higher permeability than that of said second magnetic material.

7. A head according to claim 6, wherein said first magnetic material comprises a ferrite single crystal.

8. A head according to claim 6, wherein said second magnetic material comprises a Sendust alloy.

* * * * *

UNITED STATES PATENT AND TRADEMARK OFFICE
CERTIFICATE OF CORRECTION

PATENT NO. : 4,926,276

DATED : May 15, 1990

INVENTOR(S) : Tsuyoshi Orikasa, et al.

It is certified that error appears in the above-identified patent and that said Letters Patent is hereby corrected as shown below:

COLUMN 1

Line 40, "is" should read --are--.

COLUMN 2

Line 55, "is a view" should read --are views--.

Signed and Sealed this

Twenty-second Day of September, 1992

Attest:

DOUGLAS B. COMER

Attesting Officer        Acting Commissioner of Patents and Trademarks